United States Patent
Kinugasa et al.

(10) Patent No.: US 6,387,428 B1
(45) Date of Patent: May 14, 2002

(54) GREEN TEA BEVERAGES MANUFACTURING PROCESS

(75) Inventors: Hitoshi Kinugasa; Masami Sasame; Nobuo Matsumoto; Kenji Shimaoka; Yoko Ueno; Hitoshi Niino; Kazunori Okanoya; Izumi Kobayashi, all of Shizuoka (JP)

(73) Assignee: Ito En, Ltd., Tokyo (JP)

(*) Notice: Subject to any disclaimer, the term of this patent is extended or adjusted under 35 U.S.C. 154(b) by 0 days.

(21) Appl. No.: 09/638,020

(22) Filed: Aug. 14, 2000

(30) Foreign Application Priority Data

Apr. 5, 2000 (JP) .......................... 2000-103315

(51) Int. Cl.$^7$ .............. A23F 3/00; A23F 3/16
(52) U.S. Cl. .................. 426/435; 426/52; 426/597
(58) Field of Search .................. 426/597, 435, 426/52

(56) References Cited

U.S. PATENT DOCUMENTS 4,668,525 A * 5/1987 Creswick
5,258,188 A * 11/1993 Barmentlo et al.

FOREIGN PATENT DOCUMENTS

| JP | 1-300848 | 12/1989 |
| JP | 4-228028 | 8/1992 |
| JP | 6-343389 | 12/1994 |
| JP | 8-126472 | 5/1996 |
| JP | 11-262359 | 9/1999 |

* cited by examiner

Primary Examiner—Anthony J. Weier
(74) Attorney, Agent, or Firm—Sughrue Mion, PLLC

(57) ABSTRACT

In order to produce green tea beverages which have a good flavor and a good balance of the fragrant components and do not form unpleasant precipitates, such green tea beverage are produced by a method including an extracting step consisting of two extraction steps, a first step in which green tea leaves are extracted at an applied pressure to obtain a pressure extract (step 1) and a second step in which green tea leaves are extracted under atmospheric pressure, followed by microfiltration to obtain an atmospheric extract (step 2), and a mixing step in which the pressure extract and the atmospheric extract obtained in the respective step are mixed at a mixing ratio determined on the basis of the weight of the raw tea leaves (step 3). This method can provide the production of drinks which have a good flavor and a good balance of the fragrant components and in addition, do not result in formation of deposits, and are suitable for beverages, in particular, for packing into PET bottles by mixing, at a predetermined ratio, the pressure extract from step 1, which is rich in suitable fragrance but short in astringency and tastiness, and the atmospheric extract from step 2, which is intense in astringency and tastiness and provided with a good color tone.

12 Claims, 1 Drawing Sheet

GREEN TEA BEVERAGES MANUFACTURING PROCESS

BACKGROUND OF THE INVENTION

1. Field of the Invention

The present invention relates to a manufacturing process of green tea beverages having good flavor, in which deterioration in the color tone and unpleasant precipitates do not occur even during storage for a long time, and in particular, green tea beverages which are most suitable for beverages to be packed in transparent containers.

2. Related Art Statement

As means for increasing the fragrance of green tea beverages, for example, Japanese Patent Laid-open Publication No. Hei 11-262359 discloses methods for fragrance to be given off in which undried tea leaves are roasted in a cauldron. Firing green tea leaves enhances an aroma characteristic of fired tea leaves by heating, improving the flavor of tea.

When green tea leaves are fired, however, such a treatment tends to deteriorate the color tone of the extracted solution. In the case of beverages for packing into transparent containers, in particular, therefore the color tone of drinks is an important aspect of product values and this deterioration has been a serious problem in the production of green tea beverages for packing into transparent containers.

As another means there has been proposed a method for improving the fragrance of green tea beverages by enzyme treatments. For example, Japanese Patent Laid-open Publication No. Hei 4-228028 discloses methods for producing a tea extract soluble in water having flavor by adding enzyme(s) to residues after tea extraction to hydrolyze, and Japanese Patent Laid-open Publication No. Hei 01-300848 discloses a method for enzyme treating tea leaves in water at 25 to 60° C. in the presence of an inert gas.

Enhancement of flavor by such an enzyme treatment, however, results in increasing only a green smell of the low volatile part, causing a problem of losing the balance of the fragrance. In addition, considering actual production lines, any enzyme treatment conventionally disclosed can not be said to be a practical method in any way.

Japanese Patent Laid-open Publication No. Hei 8-126472 discloses a method for mixing extracts of Gyokuro and deeply steamed tea leaves in order to improve the fragrance, and Japanese Patent Laid-open Publication No. Hei 6-343389 discloses a method for extraction at a low temperature in order to prevent off-flavor yielded during pasteurization, the occurrence of, so-called, retort-smell.

However, in the former method, extracts of Gyokuro and deeply steamed tea leaves are simply mixed, and therefore, a long storage may tend to form precipitation and they are not suitable for beverages for transparent containers. On the other hand, although the latter methods allow a retort-smell to be reduced, a long storage may still tend to form precipitation.

As described previously, treatments to enhance the fragrance of green tea beverages by conventional procedures may result in deteriorating the color tone and fragrance of the drinks and losing the balance of the fragrance, and in some cases, also cause the appearance of precipitation during a long storage.

OBJECT AND SUMMARY OF THE INVENTION

The present invention is to provide a method for producing green tea beverages which have a good flavor and a good balance of aromatic components and in addition, do not form unpleasant precipitates.

In order to achieve the present invention, green tea beverages according to the present invention are produced by a method comprising an extracting step consisting of two extraction steps, a first step in which a pressure extract is obtained by extraction of green tea leaves at an applied pressure (step 1) and a second step in which an atmospheric extract is obtained by extraction of green tea leaves under atmospheric pressure, followed by microfiltration (step 2), and a mixing step in which the pressure and the atmospheric extracts obtained in each step are mixed (step 3).

According to the method for producing tea beverages of the present invention, the pressure extract obtained in step 1 is a solution which has a fragrance suitable for beverages recovered efficiently and in a large amount, whereas it has a tendency of being short of the astringency and umami (delicious taste) characteristic of green tea. On the other hand, the atmospheric extract obtained in step 2 is intense in such astringency and umami, and tends to have a good color tone. By mixing these extracts at an appropriate ratio, the present invention has produced successfully green tea beverages which have a good flavor and a good balance of aromatic components, and in addition, do not cause the appearance of deposits, and are suitable as green tea beverages for packing in transparent containers, in particular, such as so-called PET bottles.

DESCRIPTION OF THE PREFERRED EMBODIMENT

Figure 1:
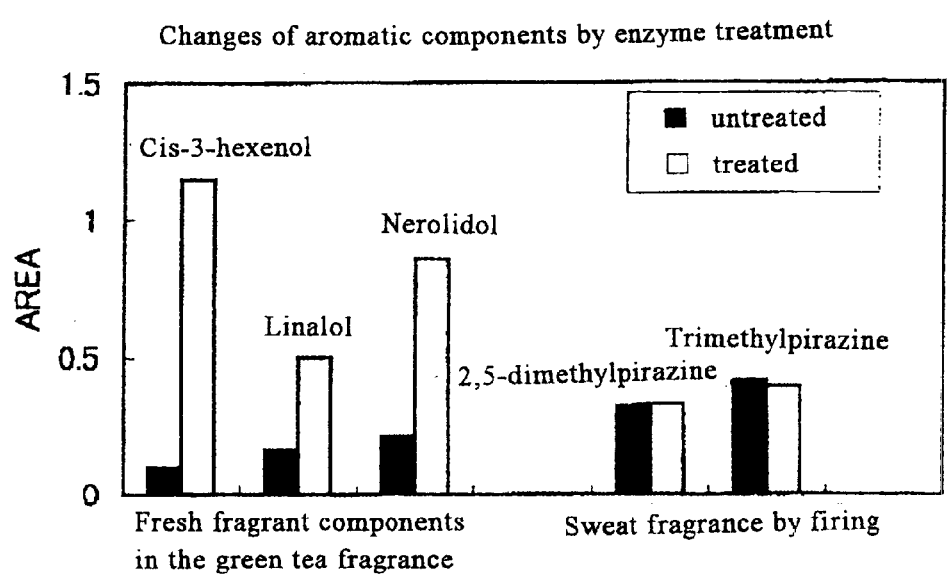
FIG. 1 is the graph showing the difference between the amounts of collected aromatic components with and without enzyme treatments.

The method according to the present invention comprises an extracting step consisting of two extraction steps, steps 1 and 2, and a mixing step: in step 1, a pressure extract is obtained by extraction of green tea leaves at an applied pressure; in step 2, an atmospheric extract is obtained by extraction of green tea leaves under atmospheric pressure, followed by microfiltration; and in step 3, the pressure extract obtained in step 1 and the atmospheric extract obtained in step 2 are mixed.

First, embodiments of step 1 will be described.

For the extraction at an applied pressure which can be carried out in step 1, it is preferable that green tea leaves are extracted with warm water at an applied pressure of 0.5 to 1.5 kg/cm$^2$, that is, at a pressure of the atmospheric pressure +0.5 to 1.5 kg/cm$^2$, in a closed condition. Applied pressures outside this range can be effective to some extent. However, significantly lower pressures than 0.5 kg/cm$^2$ do not allow a desired fragrance to be obtained in some cases, and pressures above 1.5 kg/cm$^2$ seem to have a tendency to become intense only in astringency. It is more preferable to apply a pressure in the range of 0.5 to 1.0 kg/cm$^2$.

An extracting apparatus at an applied pressure which can be used in this case is, for example, a stainless-steel extractor which can be sealed tightly and pressurized to a predetermined pressure by closing the outlet valve in the lower position and pumping warm water into the extractor from the top, and then from which an extract can be removed while maintaining the pressure by opening said outlet valve and pumping warm water into the extractor. It is preferable to use such an apparatus. However, apparatus used in the present invention are not limited to this type of extractors. Even if an extractor is an apparatus having a different structure, any extractor which can be sealed tightly and pressurized to a predetermined pressure can be used.

The extraction temperature, that is, the temperature of extracting water, is preferably in the range of 45 to 90° C., and more preferably 60 to 90° C. Temperatures outside this range can be effective to some extent. However, the temperature is below 45° C., there are difficulties in keeping the temperature constant and a possibility of not obtaining a desired fragrance, and conversely, temperatures exceeding 90° C. appear a tendency to become too intense in astringency. On the contrary, extraction with water at a temperature of 60 to 90° C. can provide a good flavor more stably.

Additionally, when tea leaves are powdered to increase the contact area and the extraction is performed at a high temperature of 60 to 90° C., fragrance which is more suitable for beverages can be collected in a larger amount.

In such extraction at an applied pressure, it is preferable that after green tea leaves are charged in a closed condition and a desired pressure of 0.5 to 1.5 kg/cm$^2$ is applied, the extraction is carried out with warm water immediately. When green tea leaves are kept for some period under a pressurized atmosphere prior to extraction with warm water, there is a tendency for bitter and astringent components and the like to be extracted too much. However, since keeping them up to two minutes does not cause containing components to be extracted, keeping them within this range may yield a preferable result, depending on the condition.

One or more hydrolyzing enzymes can be added to green tea leaves. In this case, it is more preferable that green tea leaves are kept along with hydrolyzing enzyme(s) for appropriate period at the applied pressure in a closed condition. By such a treatment, much more superior fragrance components can be collected in larger amounts. Methods in which hydrolyzing enzyme(s) are added to enhance the fragrance of green tea have been proposed in the past, but procedures in which the co-existence with hydrolyzing enzyme(s) takes place at the applied pressure have not been disclosed. Furthermore, if hydrolysis is carried out in the co-existence of green tea leaves and hydrolyzing enzyme(s) under a pressurized atmosphere in this way, it will be possible to collect excellent fragrance components in larger amounts, as compared with hydrolysis carried out at an atmospheric condition. Hydrolyzing enzymes can include beta-glucosidase, cellulase, glycosidase, oligoglycosidase, and the like. Among them, beta-glucosidase and oligoglycosidase can be preferably used.

For green tea leaves to be subjected to step 1, it is preferable to employ ground tea leaves obtained by grinding tea leaves to 16 to 50 meshes. Grinding can allows fragrance components to be collected in larger amounts, as compared with unground tea leaves. Furthermore, when tea leaves are ground into the range of 16 to 50 meshes, fragrance components can be collected much more effectively. In the case of more than 50 meshes, it seems that there is a tendency of reducing the percentage of recovery of fragrance components, and in the case of less than 16 meshes, there is a possibility of becoming intense in the bitter taste.

In addition, it is preferable that green tea leaves subjected to step 1 are heat treated under an inert atmosphere, such as carbon dioxide (carbonic acid gas), nitrogen, argon and the like. Such a heat treatment can improve the balance between the fragrance which green tea possesses naturally and the sweet fragrance resulting from the heat treatment of green tea leaves.

Heat treatment can be carried out by using various heating means, such as far-infra red rays, direct heating, and the like. Heating means used in the present invention are not to be limited to specific means.

Now, embodiments of step 2 will be described below.

In this step, green tea leaves are subjected to extraction under atmospheric pressure according to ordinary procedures, followed by microfiltration. The term "extraction under atmospheric pressure according to ordinary procedures" is intended to include, in general, methods for extraction with warm or cold water under atmospheric pressure which are carried out in conventionally producing green tea beverages. Examples can include methods in which extraction is carried out, for example, with an extracting apparatus called kneader, and extraction residues are removed, for example, by filtration.

In step 2, preferably, there can be exemplified a method in which an atmospheric extract is obtained by extracting green tea leaves with warm water under atmospheric pressure employing a kneader, removing used tea leaves from the resulting extract prior to the addition of vitamin C, and rapid cooling and microfiltration.

For green tea leaves used in step 2, it is preferable to use usual tea leaves without grinding. Use of ground leaves is likely to be rather causes of reducing fragrance, since bitter and/or astringent components are collected in large amounts.

Next, in step 3 are mixed the pressure extract obtained in step 1 and the atmospheric extract obtained in step 2. In this case, a desirable mixing ratio of the pressure extract and the atmospheric extract is 5:95 to 50:50, and more preferably 5:95 to 25:75, even more preferably 10:90 to 20:80, based on the weight of the raw tea leaves. In particular, when mixing is carried out at a mixing ratio in the range of 10:90 to 20:80, it is possible to produce green tea beverages having, needless to say, an excellent flavor, keeping the balance of the fragrance and umami, and furthermore, causing no formation of unpleasant precipitates.

The mixing ratio based on the weight of the raw tea leaves does not intend a simple ratio of the amounts of the pressure extract and the atmospheric extract, but means a mixing ratio converted into the weight of the raw tea leaves used in steps 1 and 2. This concept of the mixing basis does consist in one of features of the present invention. According to this mixing basis, for example, if in step 1, x ml of a pressure extract is obtained from X g of raw tea leaves by extraction at the applied pressure, and in step 2, y ml of an atmospheric extract from Y g of raw tea leaves by extraction under atmospheric pressure, and the whole volume of each of the obtained extracts is mixed, then the mixing ratio is X:Y, regardless of the volume of the extracts (values of x and y). If ½ of the pressure extract and the whole volume of the atmospheric extract are mixed, then the ratio is 1/2 fin X:Y, and If ¼ of the pressure extract and the whole volume of the atmospheric extract are mixed, then the ratio is 1/4 X:Y.

The method for producing green tea beverage according to the present invention can also be controlled on another basis, in addition to the above-mentioned basis. That is, the method for producing green tea beverage according to the present invention can be controlled on the basis of in the amount of catechins in green tea beverages (the amount of catechins in the present invention refers to the sum of epicatechin gallate, epicatechin, epigallocatechin gallate, and epigallocatechin). It is preferable that the amount of catechins in the final extract after mixing is adjusted to be in the range of 35 to 45 mg % (mg % = milli-% by weight, in the present invention). The amount of catechins less than 35 mg % tends for the fragrance to become weak, and more than 50 mg % catechins may cause formation of unpleasant precipitates, depending on the condition.

The amount of catechins in the green tea beverages can be adjusted by varying the extraction time and temperature in step 2. However, the present invention is not limited to these.

The following exemplifies the best embodiment of the present invention.

In step 1, green tea leaves which have been fired under an inert atmosphere are ground to be in the range of 16 to 50 meshes. To the ground leaves is/are added hydrolyzing enzyme(s), and the mixture is placed into an extractor as described above, and then is kept for the order of 30 seconds to 2 minutes at an applied pressure of 0.5 to 1.5 kg/cm². After that, a pressure extract is obtained by extraction with water at a temperature of 60 to 90° C. while maintaining the pressurized condition.

In step 2, to obtain an atmospheric extract, green tea leaves which have not been subjected to grinding nor heat treatment are extracted on, for example, an extractor called kneader, and containing used leaves and others are removed from the resulting extract, for example, by filtration, followed by microfiltration.

In step 3, the pressure and the atmospheric extracts obtained in steps 1 and 2 are mixed at a mixing ratio of 5:95 to 25:75, based on the weight of the raw green tea leave.

Step 2: Using the above-mentioned extractor which was opened to the air, 1 kg of unground green tea leaves was extracted for 4 minutes with 100 L water at 70° C. under atmospheric pressure. Containing used leaves were removed from the resultant extract, to which vitamin C was added, followed by rapid cooling and subsequent microfiltration to obtain solution (b).

Step 3: Mixtures of solutions (a) and (b) were prepared varying the mixing ratio based on the weight of the raw green tea leaves (10:90, 20:80, 30:70, and 40:60) by adjusting the volume of the respective extracts, and sterilized to obtain solutions (c1) to (c4).

As a conventional method, solution (b) was also sterilized to form solution (b1).

For solutions (a), (b1), and (c1) to (c4), the observation of the formation of deposits and sensory testing of the fragrance were carried out after standing them at 37° C. for one month. The results are summarized in Table 1 below:

TABLE 1

| | Extraction method | Mixing (pressure extract/ conventional extract) | Formation of Deposits | Sensory testing | Overall score |
|---|---|---|---|---|---|
| b1 | Conventional method | 0/100 | − | Weak fragrance along with umami | Δ |
| | Pressure extraction (temperature/pressure) | | | | |
| a | 80° C./1.0 kg/cm² | 100/0 | − | Poor taste along with fragrance | X |
| | The present invention | | | | |
| c1 | 80° C./1.0 kg/cm² | 10/90 | − | Good, an intense taste along with fragrance | ○ |
| c2 | | 20/80 | − | Good, an intense taste along with fragrance | ○ |
| c3 | | 30/70 | + | Good, an intense taste along with fragrance | X |
| c4 | | 40/60 | + | Slightly poor balance | X |

Assessment method
precipitation: − not formed
precipitation: + deposits formed
Overall score:
○: 8 points or higher
Δ: 5 points or higher
X: below 5 points The extract mixed in step 3 is made up, sterilized, and packed into containers, according to usual procedures.

Kinds of tea leaves to be used in steps 1 and 2 are not limited. Any kind of tea leaves can be treated according to the present invention, regardless of species, harvesting places and times, cultivating methods, and the like of the raw tea leaves.

The effects of the present invention are now described through various testing as follows:

Test 1

Step 1: Into a tightly-closable stainless steel extractor was placed 1 kg of green tea leaves ground to 30 meshes, and water at 80° C. was poured into the extractor to increase the inner pressure of the extraction chamber. While maintaining the pressure of 1.0 kg/cm² (the atmospheric pressure +1.0 kg/cm²), an extract was removed to obtain solution (a).

The results indicate that solution (b1) obtained by the conventional method had umami, but had a weak fragrance. Solution (a) had fragrance, but was poor in umami. On the contrary, among solutions (c1) to (c4), solutions (c1) and (c2), which were obtained by mixing solutions (a) and (b) at a ratio of 10:90 to 20:80 based on the weight of the raw teas leaves, did not only keep the balance of the fragrance and umami, but also were found not to form unpleasant precipitates.

In addition, instead of ground green tea leaves used in step 1, unground green tea leaves were used as leaves for extraction and the same testing was carried out. The ground green tea leaves provided beverages which had an intense fragrance and also kept the balance.

Test 2

Step 1: Into a tightly-closable stainless steel extractor was placed 1 kg of green tea leaves ground to 30 meshes, and water at a predetermined temperature of 45 to 100° C. was poured into the extractor to increase the inner pressure of the extraction chamber. While maintaining the pressure at a level of 0.5 to 1.5 kg/cm² (the atmospheric pressure +0.5 to 1.5 kg/cm²), an extract was removed to obtain solutions (d1) to (d11).

Step 2: Using the above-mentioned extractor which was opened to the air, 1 kg of unground green tea leaves was extracted for 4 minutes with 100 L water at 70° C. under atmospheric pressure. Containing used leaves were removed from the resultant extract, to which vitamin C was added, followed by rapid cooling and subsequent microfiltration to obtain solution (e).

Step 3: Mixtures of solutions (d1) to (d11) and (e) were prepared at a mixing ratio of 20:80 based on the weight of the raw green tea leaves by adjusting the volume of the respective extracts, and sterilized to obtain solutions (f1) to (f11).

For solutions (f1) to (f11), the observation of the formation of deposits and sensory testing of the fragrance were carried out after standing them at 37°C. for one month. The results are summarized in Table 2 below. In this case, sensory testing was carried out, as compared with the flavor of solution (e).

in the range of 60 to 90 ° C. and at pressures in the range of 0.5 to 1.5 kg/cm².

In addition, instead of ground green tea leaves used in step 1, unground green tea leaves were used as leaves for extraction and the same testing was carried out. The ground green tea leaves provided beverages which had an intense fragrance and also kept the balance.

Test 3

Step 1: Into a tightly-closable stainless steel extractor was placed 1 kg of green tea leaves ground to 30 meshes, and water at 80° C. was poured into the extractor to increase the inner pressure of the extraction chamber. While maintaining the pressure at a level of 1.0 kg/cm² (the atmospheric pressure +1.0 kg/cm²), an extract was removed to obtain solution (g).

Step 2: Using the above-mentioned extractor which was opened to the air, 1 kg of green tea leaves was extracted for 4 minutes with 100 L water at a temperature of 50 to 85° C. under atmospheric pressure. Containing used leaves were removed from the resultant extract, to which vitamin C was added, followed by rapid cooling and subsequent microfiltration to obtain solutions (h1) to (h4).

Step 3: Mixtures of solutions (g) and (h1) to (h4) were prepared varying the mixing ratio based on the weight of the

TABLE 2

| | Pressure extraction (temperature/pressure) | Mixing ratio | Formation of Deposits | Sensory testing | Overall score |
|---|---|---|---|---|---|
| f1 | 45° C./0.5 kg/cm² | 20/80 | − | Weaker flavor than the conventional method | X |
| f2 | 45° C./1.0 kg/cm² | 20/80 | − | Weaker flavor than the conventional method | X |
| f3 | 45° C./1.5 kg/cm² | 20/80 | − | Weaker flavor than the conventional method | X |
| f4 | 60° C./0.5 kg/cm² | 20/80 | − | Better taste than the conventional method but a weak flavor | Δ |
| f5 | 60° C./11.0 kg/cm² | 20/80 | − | Better taste than the conventional method, but a slight weak flavor | ◯ |
| f6 | 60° C./1.5 kg/cm² | 20/80 | − | Better taste than the conventional method | ◯ |
| f7 | 70° C./0.5 kg/cm² | 20/80 | − | Good taste along with fragrance | ◯ |
| f8 | 70° C./1.0 kg/cm² | 20/80 | − | Good taste along with fragrance | ◯ |
| f9 | 70° C./11.5 kg/cm² | 20/80 | − | Astringent taste | Δ |
| f10 | 90° C./0.5 kg/cm² | 20/80 | − | Good taste along with fragrance | ◯ |
| f11 | 90° C./1.0kg/cm² | 20/80 | − | Astringent taste | Δ |

Assessment method
precipitation: − not formed
precipitation: + deposit formed
Overall score
◯: 8 points or higher
Δ: 5 points or higher
X: below 5 points The results indicate that solutions obtained from extracts produced at 45° C. at all the applied pressures had a weaker flavor than solution (e) (the conventional method). At 60° C., improvement was achieved relative to solution (e), and the results became better as the pressure increased. At 70° C., the conditions at 0.5 kg/cm² and 1.0 kg/cm² brought about significantly good results, and at 90° C., the condition at 0.5 kg/cm² brought about significantly good results.

From the results, it was found that the conditions of the extraction at an applied pressure in step 1 are at temperatures raw green tea leaves (0:100 to 25:75) by adjusting the volume of the respective extracts, and sterilized to obtain solutions (i1) to (i6).

For solutions (i1) to (i6), the amount of catechins was determined, and the observation of the formation of deposits and sensory testing of the flavor were carried out after standing them at 37° C. for one month. Some results are summarized in Table 3 below. The amount of catechins can be varied by changing the extraction temperature, that is, the temperature of water used for extraction.

TABLE 3

| Mixing ratio of extracts (based on the weight of the raw tea leaves) | Amount of catechins (mg %) | Formation of deposits (after one month) | Overall Color | Tastiness | score |
|---|---|---|---|---|---|
| i1  0/100 | 55 | +++ | Good color | Good balance | X |
|  | 55 | ‖ | Good color | Good balance | X |
|  | 41 | – | Good color | Light taste | X |
|  | 33 | – | Light color | Slightly weak taste along with low fragrance | X |
| i2  5/95 | 50 | ++ | Good color | Good taste along with intense fragrance | X |
|  | 50 | ++ | Good color | Easy to drink along with a slightly bitter taste | X |
|  | 39 | – | Good color | Weak taste along with fragrance | Δ |
|  | 31 | – | Good color | Very weak taste along with no fragrance | X |
| i3  10/90 | 45 | – | Slightly reddish color | Slightly intense fragrance | Δ |
|  | 45 | – | Good color | Easy to drink along with weak bitter taste | ○ |
|  | 35 | – | Good color | Easy to drink along with good fragrance | ○ |
|  | 30 | – | Intensely reddish color along with light color | Poor balance | X |
| i4  20/80 | 40 | – | Reddish color | Strong taste | X |
|  | 40 | – | Good color | Easy to drink along with a good fragrance | ○ |
|  | 35 | – | Slightly reddish color | Good taste along with slightly weak taste | Δ |
|  | 25 | – | Intensely reddish color | Poor balance | X |
| i5  25/75 | 37 | – | Reddish color | Strong taste | Δ |
|  | 37 | – | Slightly reddish color | Slightly strong taste | X |
|  | 26 | – | Intensely reddish color | Slightly strong taste | X |
|  | 23 | – | Intensely reddish color | Poor balance | X |
| i6  30/70 | 34 | – | Intensely reddish color along with light color | Poor balance | X |
|  | 34 | – | Intensely reddish color | Poor balance | X |
|  | 24 | – | Intensely reddish color | Poor balance | X |
|  | 20 | – | Intensely reddish color | Poor balance | X | precipitation: – not formed
precipitation: + a few deposit formed
precipitation: ‖ formed
Assessment method
Overall score
○: 8 points or higher
Δ: 5 points or higher
X: below 5 points The results indicate that when the amount of catechins was adjusted to be over 50 mg %, the formation of deposits was observed, and when the amount of catechins was below 35 mg %, the intensity of the fragrance became weak. Therefore, it has been found that the amount of catechins is preferably 35 to 50 mg %, from the point of the formation of deposits and the flavor.

Test 4

Step 1: Into a tightly-closable stainless steel extractor was placed 1 kg of green tea leaves ground to 30 meshes, and water at 80° C. was poured into the extractor to increase the inner pressure of the extraction chamber. While maintaining the pressure at a level of 1.0 kg/cm$^2$ (the atmospheric pressure +1.0 kg/cm$^2$), an extract was removed to obtain solution (j).

Step 2: Using the above-mentioned extractor which was opened to the air, 1 kg of green tea leaves was extracted for 4 minutes with 100 L water at a temperature of 50 to 85° C. under atmospheric pressure. Containing used leaves were removed from the resultant extract, to which vitamin C was added, followed by rapid cooling and subsequent microfiltration to obtain solutions (k1) to (k5). In this case, the temperature of the extracting water was varied to adjust the amount of catechins.

Step 3: Mixtures of solutions a) and (k1) to (k5) were prepared varying the mixing ratio based on the weight of the raw green tea leaves (0:100 to 45:55) by adjusting the volume of the respective extracts, and sterilized to obtain solutions (m1) to (m50).

For solutions (m1) to (m50), the tastiness and the color were assessed. The results are summarized in Table 4 below.

TABLE 4

| Mixing ratio of extracts | The amount of catechins (mg %) | | | | |
|---|---|---|---|---|---|
| (based on the weight of the raw tea leaves) | 25 | 30 | 35 | 40 | 45 |
| 45/50 | X | X | X | X | X |
| 40/60 | X | X | X | X | X |
| 35/65 | X | X | X | X | X |
| 30/70 | X | X | X | X | X |

TABLE 4-continued

| Mixing ratio of extracts | The amount of catechins (mg %) | | | | |
|---|---|---|---|---|---|
| (based on the weight of the raw tea leaves) | 25 | 30 | 35 | 40 | 45 |
| 25/75 | X | X | X | Δ | Δ |
| 20/80 | X | X | Δ | ○ | ○ |
| 15/85 | X | X | ○ | ○ | ○ |
| 10/90 | X | X | ○ | ○ | Δ |
| 5/95 | X | X | ○ | Δ | X |
| 0/100 | X | X | Δ | X | X |

Assessment method
○: a good taste and color
ΔΔ: a slightly good taste and color
X: a bad taste and color From the results, it was found that the most preferable beverage was obtained in terms of flavor, when the amount of catechins was adjusted to be 35 to 45 mg %, and the extract obtained in step 1, solution (j), and the extracts obtained in step 2, solutions (k1 to k5) were mixed at a ratio of 5:95 to 25:75, based on the weight of the raw tea leaves.

Test 5

Step 1: Into a tightly-closable stainless steel extractor was placed 1 kg of green tea leaves which were ground to 10 to 60 meshes or not ground, and water at 80° C. was poured into the extractor to increase the inner pressure of the extraction chamber. While maintaining the pressure at a level of 1.0 kg/cm² (the atmospheric pressure +1.0 kg/cm²), an extract was removed to obtain solutions (n1) to (n9).

Step 2: Using the above-mentioned extractor which was opened to the air, 1 kg of unground green tea leaves was extracted for 4 minutes with 100 L water at 70° C. under atmospheric pressure. Containing used leaves were removed from the resultant extract, to which vitamin C was added, followed by rapid cooling and subsequent microfiltration to obtain solution (o).

Step 3: Mixtures of solutions (n1) to (n9) and (o) were prepared at a mixing ratio of 20:80, based on the weight of the raw green tea leaves by adjusting the volume of the respective extracts, and sterilized to obtain solutions (p1) to (p9).

For solutions (p1) to (p9), the sensory testing was carried out on flavor. The results are summarized in Table 5 below.

TABLE 5

| | Size of the raw tea leaves (meshes) | Sensory testing | Overall assessment |
|---|---|---|---|
| p1 | Usual green tea | Weak fragrance | X |
| p2 | Powdered tea 10 meshes | Bad taste along with an intensely bitter taste | X |
| p3 | 15 meshes | Slightly bitter taste | Δ |
| p4 | 20 meshes | Good taste | ○ |
| p5 | 25 meshes | Good taste | ○ |
| p6 | 30 meshes | Good taste | ○ |
| p7 | 40 meshes | Good taste | ○ |
| p8 | 50 meshes | Slightly weak fragrance | Δ |
| p9 | 60 meshes | Weak fragrance | X |

Overall score
○: 8 points or higher
Δ: 5 points or higher
X: below 5 points

The results indicate that unground green tea leaves had a weak fragrance, and fragrant components were not collected effectively. When green tea leaves were ground below 15 meshes or lower, however, beverages obtained were bitter and bad in terms of flavor. When ground over 50 meshes or higher, fragrance was not collected effectively.

From the results, therefore, it was found that the fragrant components were collected effectively by using, as leaves to be extracted, tea leaves which were ground into the range of 15 and 50 meshes.

Test 6

This test was carried out to determine effects of firing under an inert atmosphere on tea leaves used in step 1.

Step 1: A flow drum firing machine was employed. Carbon dioxide was fed into the drum of the firing machine, and green tea leaves were subjected to firing under the condition of the temperature of 85° C., the drum rotation speed of 10 rpm, and the drum tilt of 0.25. The green tea leaves treated thus by firing under the inert atmosphere (carbon dioxide) were ground to 30 meshes, and 1 kg of the ground leaves was placed into a tightly-closable stainless steel extractor, and then water at 80° C. was poured into the extractor to increase the inner pressure of the extraction chamber. While maintaining the pressure at a level of 1.0 kg/cm² (the atmospheric pressure +1.0 kg/cm²), an extract was removed to solution (q1). Also, tea leaves with firing under the air were extracted at the applied pressure in the same way to obtain an extract, solution (q2).

Step 2: Using the above-mentioned extractor which was opened to the air, 1 kg of unground green tea leaves was extracted for 4 minutes with 100 L water at 70° C. under atmospheric pressure. Containing used leaves were removed from the resultant extract, to which vitamin C was added, followed by rapid cooling and subsequent microfiltration to obtain solution (r).

Step 3: Mixtures of solutions (q1) or (q2) and (r) were prepared at a mixing ratio of 20:80, based on the weight of the raw green tea leaves by adjusting the volume of the respective extracts, and sterilized to obtain solutions (s1) and (s2).

Table 6 below shows results of the sensory testing on the color and tastiness, along with the conditions of firing for solutions (s1) and (s2).

TABLE 6

| | | s1 Treatment with $CO_2$ gas | s2 Usual treatment |
|---|---|---|---|
| Treating condition | Enzyme (%) | 1.3 | 20.8 |
| | Humidity (%) | 37 to 41 | 13 to 14 |

TABLE 6-continued

| | | s1<br>Treatment with $CO_2$ gas | s2<br>Usual treatment |
|---|---|---|---|
| | Temperature (° C.) | 80 | 80 |
| | Water content before | 5 | 5 |
| | Water content after | 1 | 1.5 |
| Sensory testing | Color | Not changed | Slightly reddish color |
| | Tastiness | Good balance between fragrant smell and green taste | Intense green-taste and residual astringency of black tea |

From the results, it was found that firing under the atmosphere of an inert gas increased rapidly the humidity in the treating drum, so that the amount of water in green tea leaves was reduced and effects of firing were achieved efficiently. In sensory testing, firing under the air had an intense green-taste and in addition, residual astringency, whereas firing under an inert gas gave a good balance between the sweat fragrance and the green-taste.

Test 7

This test was carried out to determine effects of concurrent enzyme treatment in extraction at the applied pressure in step 1, in particular effects of efficiently collecting tea components.

Step 1: A flow drum firing machine was employed. Carbon dioxide was fed into the drum of the firing machine, and green tea leaves were subjected to firing under the condition of the temperature of 85° C., the drum rotation speed of 10 rpm, and the drum tilt of 0.25. The green tea leaves treated thus by firing under the inert atmosphere were ground to 30 meshes, and 50 mg of a hydrolyzing enzyme (beta-glucosidase) was added to 1 kg of the ground leaves. The mixture was placed into a tightly-closable stainless steel extractor, and the pressure of the extraction chamber was increased to 1.0 $kg/cm^2$ (the atmospheric pressure +1.0 $kg/cm^2$). After 2 minute standing, water at 60° C. was poured into the extractor. While maintaining this pressure, an extract was removed to solution (t1). Also, tea leaves to which no enzyme was added were extracted at the applied pressure in the same way to obtain an extract, solution (t2).

For quantitative determination, ethyl decanoate as internal standard was added to solutions (t1) and (t2), and aromatic components were collected by continuous steam distillation. After collection and concentration, the aromatic components were determined quantitatively by gas chromatography. The result is shown in FIG. 1. The quantitative method was by the area ratio of an individual component to the internal standard (ethyl decanoate).

As shown in FIG. 1, when enzyme treatment was not carried out, firing reduced the amounts of a component of refreshing fragrance characteristic of green tea (cis-3-hexenol) and major components of green tea (linalol and nerolidola), and resulted in remaining only fragrant components from firing and losing the balance.

On the contrary, it was found that enzyme treatment provided a good residual balance of a component of refreshing fragrance characteristic of green tea (cis-3-hexenol), major components of green tea (linalol and nerolidol), and sweat fragrant components resulted from firing.

What is claimed is:

1. A method for producing green tea beverages, characterized by mixing
   (1) a pressure extract obtained by extraction of a first quantity of green tea leaves at an applied pressure, and
   (2) an atmospheric extract obtained by (a) extraction of a second quantity of green tea leaves under atmospheric pressure, followed by (b) microfiltration.

2. The method of claim 1, characterized in that the pressure extract and the atmospheric extract are mixed at a mixing ratio of 5:95 to 25:75, based on the weight of raw tea leaves used to generate said first quantity and said second quantity, respectively.

3. The method of claim 1, characterized in that the amount of catechins after mixing the pressure extract and the atmospheric extract is adjusted to be in the range of 35 to 45 mg %.

4. A method for producing green tea beverages, comprising the steps of:
   obtaining a pressure extract by extraction of a first quantity of green tea leaves at an applied pressure (step 1),
   obtaining an atmospheric extract by extraction of a second quantity of green tea leaves under atmospheric pressure followed by microfiltration (step 2), and
   mixing the pressure extract produced in step 1 and the atmospheric extract produced in step 2 (step 3).

5. The method of claim 4, characterized in that the pressure extract and the atmospheric extract are mixed at a mixing ratio of 5:95 to 25:75, based on the weight of raw tea leaves used in said first quantity and said second quantity, respectively.

6. The method of claim 4, characterized in that the amount of catechins in the extract after mixing is adjusted to be in the range of 35 to 45 mg %.

7. The method of claim 4, characterized in that the extraction at an applied pressure in step 1 is carried out with water at a temperature of 60 to 90° C. and at an applied pressure of 0.5 to 1.5 $kg/cm^2$ in a closed environment condition.

8. The method of claim 4, wherein step 1 is characterized in that the extraction at an applied pressure is carried out after adding one or more hydrolyzing enzymes to the green tea leaves and keeping the green tea leaves along with the hydrolyzing enzyme(s) for a predetermined period at an applied pressure in a closed environment condition.

9. The method of claim 4, characterized in that for the green tea leaves to be extracted at an applied pressure in step 1, ground tea leaves obtained by grinding tea leaves into 16 to 50 meshes are employed.

10. The method of claim 4, characterized in that for the green tea leaves to be extracted at an applied pressure in step 1, green tea leaves treated with heat under the atmosphere of an inert gas are employed.

11. The method of claim 4, wherein step 1 comprises the extraction of ground green tea leaves at an applied pressure carried out with water at a temperature 60 to 90° C. at an applied pressure of 0.5 to 1.5 $kg/cm^2$ in a closed environment condition, wherein the ground green tea leaves are obtained by treating green tea leaves with heat under the atmosphere of an inert gas and grinding into 16 to 50 meshes.

12. The method of claim 4, wherein step 1 comprises the extraction at an applied pressure carried out with water at a temperature 60 to 90° C. at an applied pressure of 0.5 to 1.5 kg/cm$^2$ in a closed environment condition after adding one or more hydrolyzing enzymes to ground green tea leaves and keeping the ground green tea leaves along with the hydrolyzing enzymes for a predetermined period at an applied pressure in a closed condition, wherein the ground green tea leaves are obtained by treating green tea leaves with heat under the atmosphere of an inert gas and grinding into 16 to 50 meshes.

\* \* \* \* \*